United States Patent Office 3,524,493
Patented Aug. 18, 1970

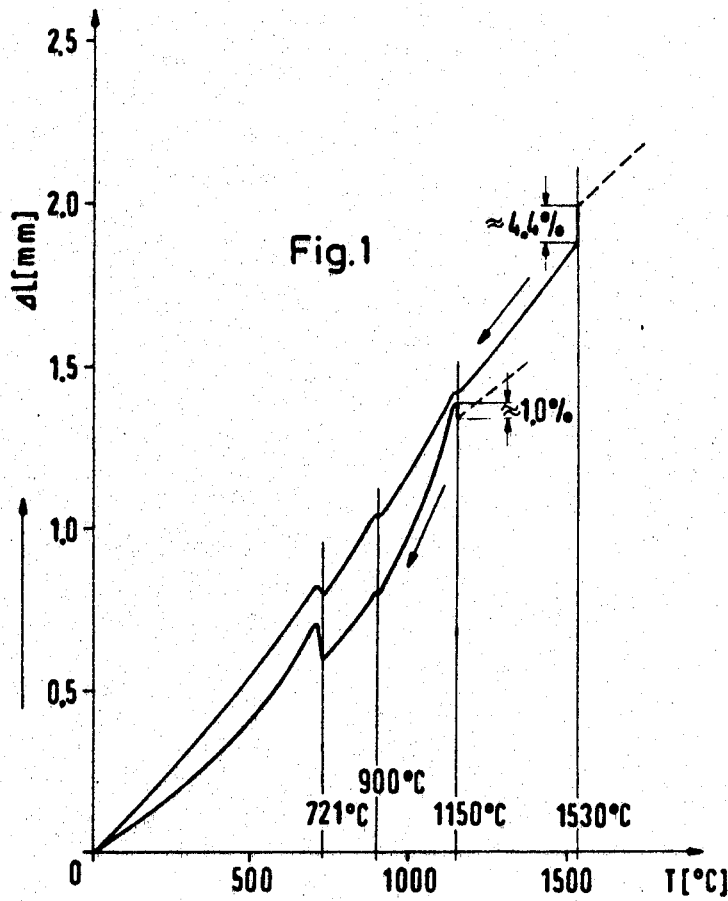
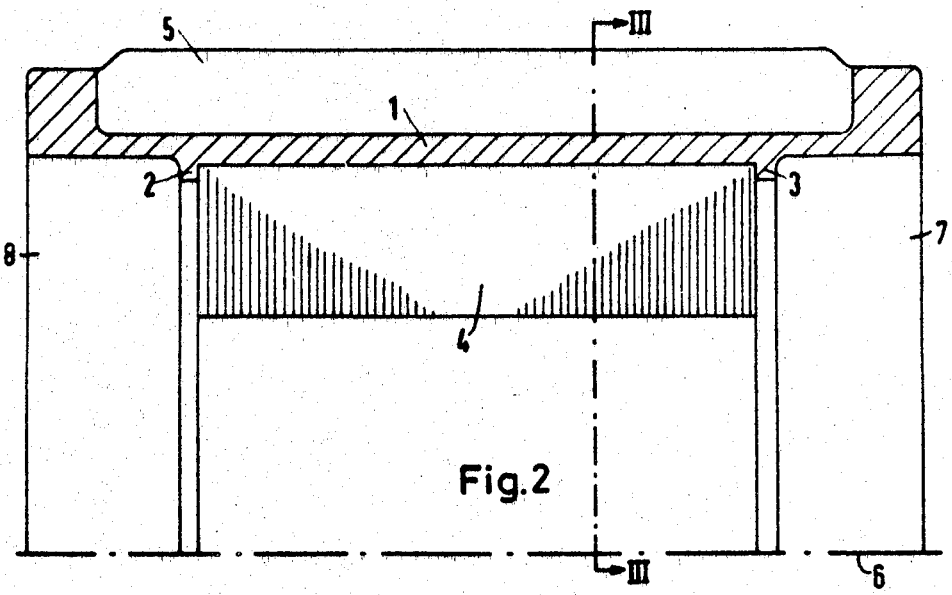

3,524,493
METHOD OF MAKING STATOR CORE BY CASTING GRAY IRON AROUND LAMINATION STACK
Justin Doll, Muhlbach, near Bad Neustadt an der, Saale, Henryk Fidos, Nuremberg, Dirk Forkel, Bad Neustadt an der, Saale, and Horst Schreiner, Nuremberg, Germany, assignors to Siemens Aktiengesellschaft, Berlin and Munich, Germany, a corporation of Germany
Filed Dec. 12, 1968, Ser. No. 783,297
Claims priority, application Germany, Dec. 15, 1967, 1,613,439
Int. Cl. B22d 19/00; H02k 15/00
U.S. Cl. 164—109                                      8 Claims

ABSTRACT OF THE DISCLOSURE

Electric machines with a stack of stator laminations enclosed in a housing of gray cast iron is produced by preheating the stator stack to a temperature between 300 and 900° C., inserting the heated stack into a mold so that it forms a core structure in the mold, and then filling the mold with a molten iron to thereby form the cast-iron housing with the stator stack seated therein. The preheating of the stator stack is preferably effected by electric induction and in an oxidizing atmosphere at a temperature of approximately 500° C.

---

Figure 3:
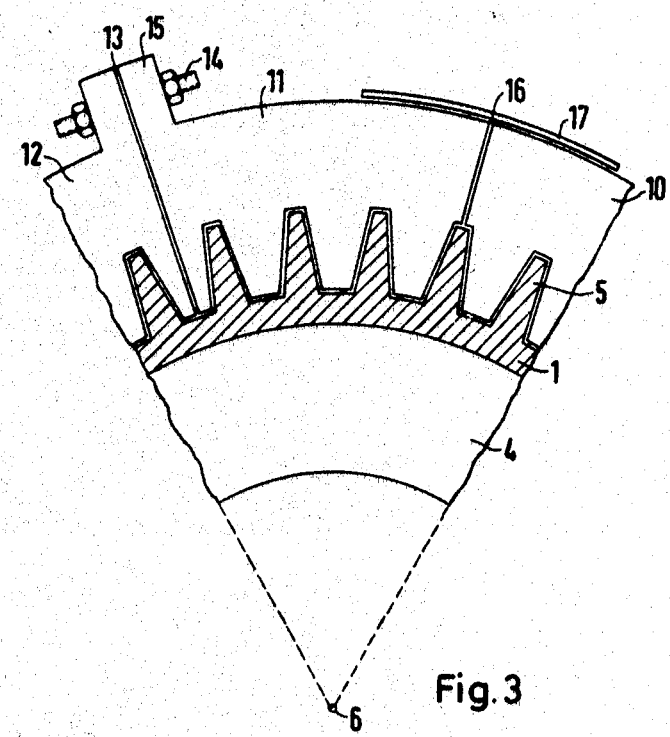

Our invention relates to a method of producing or assembling electric machines of the type having a stack of stator laminations enclosed by a housing of gray cast iron.

It has been customary to separately produce the housing of such machines from gray cast iron and to then machine the inner surfaces of the housing by turning on a lathe. This requires accurately orienting the housing on the machine tool so that the machining axis will coincide with the center axis of the casting. Since the stator stack must be tightly enclosed by the casing, a tight-fitting tolerance is required. The stator stack, as a rule, must be machined on the outside, and in any event the housing of gray cast iron must be machined on the inside. The stator stack with the appertaining electric windings is then pressed into the cast-iron housing. The necessary machining and press-fitting operations are expensive. Difficulties occur particularly when the housing to be machined consists of gray cast iron with a zone of hard white cast-iron at the surface. Particularly with pressure-resistant or pressure-sealed motors there occurs some amount of waste due to the fact that the machining tends to expose pores contained in the casting. When joining the stator stack with the housing by casting the housing onto and around the stack, the difference in the coefficients of thermal expansion between the iron of the stack of stator laminations, on the one hand, and the housing of gray cast iron, on the other hand, causes tension to occur in the gray cast iron, resulting in cracks or fissures in the housing.

In many cases, the punched stator laminations are individually subjected to a heat treatment in an oxidizing atmosphere which produces an oxide coating on the individual laminations for the purpose of reducing the electrical losses in the stator. When the oxidized dynamo-sheet laminations are pressed together to form the stack, the burrs of the punchings are forced into the adjacent laminations and then produce new current-conducting paths. Furthermore, when the stator stack is pressed into the housing, an electrically conducting connection with the housing is established. These various flux or conductance paths increase the total losses of the machine.

It is an object of our invention to minimize the above-mentioned manufacturing trouble and to reduce the total electrical losses or the heretofore encountered wide spread of the loss quantities, occurring in electrical machines of the type mentioned.

We have discovered, according to our invention, that a fissureless casting of iron around the stator stack can be produced with gray cast iron by preheating the stator stack to a temperature between 300 and 900° C. and then inserting the heated stator stack into the casting mold used for forming the housing, so that the subsequent casting of the housing material into the mold will result in having the stator stack, acting as a core structure, inserted and seated inside the resulting housing. The preheating of the stator stack is preferably effected by electric induction.

According to another, more specific feature of our invention, the heat treatment of the stator stack is preferably effected in an oxidizing atmosphere in order to form an oxidizing coating on the stack. This avoids, to a great extent, that the punching burrs will form conducting paths to the adjacent laminations. Applicable as an oxidizing atmosphere is air or a steam-containing atmosphere.

Due to the preheating, the stator stack is in the thermally expanded state when the cast iron is poured into the mold. After solidification of the gray iron casting, there occurs a conjoint shrinking of the stack and of the housing.

By virtue of the method according to the invention, the machining in the inner jacket surface of the housing formed of gray cast iron is completely dispensed with. Only a slight amount of machining of the housing remains necessary to obtain a proper engagement with the bearing shields. Furthermore, the method of the invention affords a considerable saving in volume of gray cast iron. The smaller volume is achieved by eliminating the otherwise necessary addition of material that permits machining of the cylindrical interior surface of the cast-iron housing and also by virtue of the fact that the wall thicknesses can be reduced.

The invention further offers the advantage of a better heat transfer from the stator stack to the cast-iron housing. When a finally machined housing according to the prior art is joined by a press fit with the stator stack, there occurs only a pressure heat contact along the geometric surface of mutual engagement. In contrast thereto, the joining of stator stack and cast-iron housing by the casting technique according to the present invention affords obtaining a more intimate bonding and consequently an improved transfer of conductance of the heat generated within the stator winding and passing from the stack outwardly to the housing.

It will be understood that the invention is predicated upon the phenomenon that due to the preheating of the stator stack to the above-mentioned temperature, the differences in thermal coefficient of expansion are reduced to such an extent that during cooling no fissures will occur in the cast-iron housing.

The invention will be further elucidated with reference to the accompanying drawing, in which:

FIG. 1 is an explanatory graph;
FIG. 2 is a longitudinal section through a portion of a housing of an electrical machine which is cast onto and about the stator stack of the machine;
FIG. 3 shows a sector of a cross section along the line III—III in FIG. 2.

The graph shown in FIG. 1 relates to the shrinking of gray cast iron and dynamo steel sheet in dependence upon temperature. The abscissa denotes temperature in degrees centigrade. The ordinate denotes shrinkage $\Delta L$ in millimeters (mm.). The upper curve in FIG. 1 relates to the dynamo steel of the stator stack, the lower curve relates to gray cast iron. When molten steel, of which the stator laminations are made, convert from liquid to the solid state, there occurs a shrinkage of 4.4%. During the corresponding phase transition of gray cast iron from liquid to solid state, the shrinking is negative and amounts to 1.0%. With the progressing cooling below the solidus temperature of the gray cast iron, the two shrinkage curves differ more greatly from each other. In the temperature range about 721° C. there occurs a point of reversal due to the perlitic conversion which is only small in the case of steel but is about three times as large with gray cast iron. During further cooling below 721° C., the shrinkage curve of gray cast iron at first follows a shallower course and after approaches the curve of steel.

Due to the difference in the ΔL curves during cooling, the shrinking of the two materials, steel and gray cast iron, results as a rule in such a greatly different amount of shrinking that the tensile strength of the cast iron is exceeded and damage or breaking of the housing structure occurs.

When the cold stator stack is placed into the casting mold and liquid gray cast iron is cast into the mold and around the stack, the stack will expand in accordance with the expansion curve until a temperature equilibrium is attained. After the temperature of the casting drops below the melting temperature of gray cast iron, the cast iron assumes its solid phase. During further cooling of the cast iron, it will continue shrinking in accordance with the lower curve of the diagram shown in FIG. 1. While the solidified gray cast iron is already shrinking, the stator stack is still being heated up until the temperature equilibrium is reached so that the stack will still expand. During cooling of the stator stack and simultaneous cooling of the gray-iron casting, the mutually opposed shrinking phenomena will cause tensions to occur, which, when they exceed the strength of the gray cast-iron structure, will result in fissures in the housing.

If the stator stack is preheated to a temperature between 300 and 900° C., preferably about 500° C., the tensions occurring during cooling can be reduced to such an extent as to avoid the occurrence of such fissures in the housing of gray cast iron.

The method is particularly well suitable for the production of small electric machines, especially for power ratings between 1 and 15 kv.

The embodiment of a machine made according to the invention and illustrated in FIGS. 2 and 3 is presented by way of example, it being understood that the invention is applicable to machines of different size or shape or a different design and configuration of the individual components. FIG. 2, as mentioned, shows the casting of an electrical machine which is formed by casting iron around and onto the stator stack as described above. FIG. 3, showing a section of the same machine, additionally illustrates a section through the casting mold used for forming the cast-iron housing.

In FIGS. 2 and 3, the housing of the machine is denoted by 1. It is generally of cylindrical shape, its cylinder axis being denoted by 6. The housing is formed of gray cast iron and has two annular shoulders 2 and 3 protruding inwardly from its inner wall surface, the latter being raw, i.e. not machined. Mounted between these two shoulders 2 and 3 is a stack 4 of stator laminations onto and around which the housing 1 is cast. The entire cylindrical outer surface of the stack 4 abuts against the housing 1, thus securing a reliable seating and a good heat transfer. The shoulders 2 and 3 further secure a lateral fixing of the stack 4. The outer wall of the housing 1 may have integral cooling ribs 5 constituted by the same casting. The shaft of the machine, such as a motor, extends along the axis 6 and in coaxial relation thereto. The shaft is journalled in holders 8 and 7 which constitute bearing shields, the bearings proper being not illustrated.

FIG. 3 illustrates schematically the casting mold into which the stator stack 4 is inserted to form a core structure of the mold prior to filling the remaining interspace of the mold with the liquid cast iron which, upon solidification, constitutes the housing 1. The casting mold is composed of several parts 10, 11 and 12 which are firmly joined together such as at the locality 13, the junction being made by means of flanges 15 and a pressure bolt 14. However, the parts of the mold may also be joined in any other suitable manner, for example by a band which surrounds the mold and clamps it together as is the case with the band 17 partially shown in FIG. 3. The parts of the casting mold may abut against each other at the tips of the cooling ribs 5 as is the case at the junction 16 in FIG. 3, or they may also abut against each other between two cooling ribs as is the case at 13 in FIG. 3. Both ways of subdivision may be used conjointly as is the case in the embodiment exemplified by FIG. 3.

The following processing example will further elucidate the invention.

A gray cast iron containing 3.1% C, 2.1% Si, 0.6% Mn, 0.3% P and 0.08% S was melted in an induction furnace at 1480° C. The melt was doped with industrial Ca-Si. A stator stack having an outer diameter of 135 mm was preheated to 530° C. and placed into a hot-box mold. After inserting the inner core into the stator stack, the mold was immediately thereafter filled with the molten gray cast iron which had a temperature of 1480° C. After a cooling period of about 3 hours, the casting was removed from the mold and further cooled in air under normal pressure down to normal room temperature (about 20° C.). The casting exhibited a satisfactory surface. The cooling ribs of 2.5 mm. thickness were clean as to contour and dimensions. The texture of the gray cast iron was subjected to breaking and textural inspection and found to be dense and fine-granular. Between the stator stack and the housing of gray casting there existed an intimate surface of engagement securing an excellent heat transfer. No white cast iron was found to occur on the surface; the seats for the bearing shields could be readily machined by turning on a lathe.

The terminology used in this disclosure is in accordance with the one conventional in the pertinent art. If desired, reference may be had to the Encyclopedia of the Iron and Steel Industry, by A. K. Osborne, published by Philosophical Library Inc., New York (1956). For convenience, the following definition, similar to the one given for Cast Iron, on page 62 of the book, is presented:

The total carbon content of cast iron varies between about 1.8% and 4.5%, the carbon being present in excess of the amount which can be retained in solid solution in austenite at the eutectic temperature. In addition to carbon, there are also present, varying amounts of silicon, manganese, sulphur and phosphorus. These irons can normally be divided into the following types: Grey cast iron, in which all or part of the carbon content is in the form of graphite distributed through the metal, the latter being responsible for the inherently poor shock-resistance and relatively low mechanical properties of the material; White cast iron, in which practically the whole of the carbon is retained in chemical combination with the iron as carbide of iron, $Fe_3C$. This compound has a silver-white colour and the fractures of the cast iron are white. White iron is very hard and brittle and practicaly unmachinable, and is used chiefly as an intermediate product in the formation of malleable iron castings or a thin hard layer on the surface of a softer iron casting.

Upon a study of this disclosure, it will be obvious to those skilled in the art, that our invention is applicable to dynamo-electric machinery of various kinds, and, as regards structural features and dimensions, is not limited to the particular embodiment described and illustrated herein.

We claim:
1. Method of producing electric machines having a stack of stator laminations and a housing of gray cast iron enclosing the stack, which comprises heating the stator stack to a temperature between 300 and 900° C., inserting the heated stack into a casting mold so as to form a core means in the mold, and filling the mold with cast iron to thereby form the housing with the stator stack seated therein.

2. The method according to claim 1, which comprises effecting said heating of the stator stack in an oxidizing atmosphere.

3. The method according to claim 1, which comprises effecting said heating of the stator stack at a temperature between 400 and 600° C.

4. The method according to claim 1, which comprises effecting said heating of the stator stack at a temperature of about 500° C.

5. The method according to claim 1, which comprises effecting said heating of the stator stack in an oxidizing atmosphere at a temperature between 400 and 600° C.

6. The method according to claim 1, which comprises effecting said heating of the stator stack by electric induction heating.

7. The method according to claim 1, which comprises effecting said heating of the stator stack in atmospheric air.

8. The method according to claim 1, which comprises effecting said heating of the stator stack in a steam-containing atmosphere.

References Cited

UNITED STATES PATENTS

| | | | |
|---|---|---|---|
| 1,432,637 | 10/1922 | Stratton | 310—258 |
| 1,711,414 | 4/1929 | Kanaky | 310—42 X |
| 2,083,395 | 6/1937 | Pfalzgraaf | 164—109 |
| 2,493,414 | 1/1950 | Morrison | 310—217 |
| 2,711,492 | 6/1955 | Ballman | 310—254 |

WARREN E. RAY, Primary Examiner

U.S. Cl. X.R.

164—103, 333; 310—42

PO-1050
(5/69)

UNITED STATES PATENT OFFICE
CERTIFICATE OF CORRECTION

Patent No. 3,524,493      Dated August 18, 1970

Inventor(s) Justin Döll, Henryk Fidos, Dirk Forkel and Horst Schreiner

It is certified that error appears in the above-identified patent and that said Letters Patent are hereby corrected as shown below:

In the heading, page 1, column 1 - the German priority number should read --P 16 13 439.7--

SIGNED AND SEALED
NOV 17 1970

(SEAL)
Attest:

Edward M. Fletcher, Jr.
Attesting Officer

WILLIAM E. SCHUYLER, JR.
Commissioner of Patents